(12) United States Patent
Wang et al.

(10) Patent No.: US 11,080,261 B2
(45) Date of Patent: Aug. 3, 2021

(54) HYBRID CONCURRENCY CONTROL

(71) Applicant: Hewlett Packard Enterprise Development LP, Houston, TX (US)

(72) Inventors: Tianzheng Wang, Palo Alto, CA (US); Hideaki Kimura, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 119 days.

(21) Appl. No.: 16/072,055

(22) PCT Filed: Jan. 29, 2016

(86) PCT No.: PCT/US2016/015828
§ 371 (c)(1),
(2) Date: Jul. 23, 2018

(87) PCT Pub. No.: WO2017/131784
PCT Pub. Date: Aug. 3, 2017

(65) Prior Publication Data
US 2019/0042615 A1    Feb. 7, 2019

(51) Int. Cl.
*G06F 16/23*    (2019.01)
*G06F 16/00*    (2019.01)
*G06F 9/46*    (2006.01)

(52) U.S. Cl.
CPC .......... *G06F 16/2343* (2019.01); *G06F 9/466* (2013.01); *G06F 16/00* (2019.01);
(Continued)

(58) Field of Classification Search
CPC .. G06F 16/2343; G06F 16/2308; G06F 16/00; G06F 16/2315; G06F 16/2358; G06F 9/466
(Continued)

(56) References Cited

U.S. PATENT DOCUMENTS 6,826,570 B1    11/2004    Eshel et al.
6,952,829 B1 *  10/2005    Banavar .............. H04L 67/1095
                                                       709/224
(Continued)

FOREIGN PATENT DOCUMENTS

WO    2007/108859 A1    9/2007

OTHER PUBLICATIONS

B. F. Cooper, A. Silberstein, E. Tam, R. Ramakrishnan, and R. Sears. Benchmarking cloud serving systems with YCSB. In Proceedings of the 1st ACM Symposium on Cloud Computing, SoCC '10, pp. 143-154, 2010.
(Continued)

*Primary Examiner* — Phong H Nguyen
(74) *Attorney, Agent, or Firm* — Sheppard Mullin Richter & Hampton LLP (57) ABSTRACT

Hybrid concurrency control in a database transaction is disclosed. A contention value associated with a database object is read. The contention value is dynamically updated based on access patterns of the database object. If the contention value indicates the database object is under high contention, a pessimistic concurrency control mechanism is applied to the database object. An optimistic concurrency control mechanism is applied to the database object if the contention value does not indicate the database object is under high contention.

19 Claims, 5 Drawing Sheets

(52) U.S. Cl.
CPC ...... *G06F 16/2308* (2019.01); *G06F 16/2315* (2019.01); *G06F 16/2358* (2019.01)

(58) Field of Classification Search
USPC ........................................ 707/683, 684, 703
See application file for complete search history.

(56) References Cited

U.S. PATENT DOCUMENTS

| | | | | |
|---|---|---|---|---|
| 7,076,583 B2* | 7/2006 | Okuyama | ............ | G06F 11/1666 710/107 |
| 7,676,638 B2 | 3/2010 | Duffy et al. | | |
| 7,792,805 B2 | 9/2010 | Shavit et al. | | |
| 8,099,538 B2* | 1/2012 | Saha | ..................... | G06F 12/145 710/200 |
| 8,145,817 B2 | 3/2012 | Detlefs | | |
| 8,775,708 B2* | 7/2014 | Saha | ..................... | G06F 9/4881 710/200 |
| 2002/0116469 A1* | 8/2002 | Okuyama | ............... | G06F 9/544 709/213 |
| 2002/0138483 A1* | 9/2002 | Bretl | ................... | G06F 16/2315 707/999.008 |
| 2007/0239915 A1* | 10/2007 | Saha | ..................... | G06F 12/145 710/200 |
| 2008/0319997 A1 | 12/2008 | Duffy et al. | | |
| 2010/0153953 A1* | 6/2010 | Adl-Tabatabai | .... | G06F 16/2329 718/101 |
| 2012/0089760 A1* | 4/2012 | Saha | ..................... | G06F 9/4881 710/200 |
| 2012/0233139 A1 | 9/2012 | Larson et al. | | |
| 2013/0173869 A1 | 7/2013 | Saha et al. | | |
| 2016/0026502 A1* | 1/2016 | Stanfill | ................. | G06F 9/5038 719/318 |
| 2016/0070747 A1* | 3/2016 | Pottlapelli | ........... | G06F 16/2343 707/703 |

OTHER PUBLICATIONS

Bernstein et al., "Concurrency Control and Recovery in Database Systems", Addison Wesley Publishing Company, ISBN 0-201-10715-5, 1987, 58 pages.
H. Kimura. FOEDUS: OLTP engine for a thousand cores and NVRAM. SIGMOD, pp. 691-706, 2015.
Kung et al., "On Optimistic Methods for Concurrency Control", ACM Transactions on Database Systems, vol. 6, No. 2, Jun. 1981, pp. 213-226.
Lindstrom, J, "Hybrid Concurrency Control Method in Firm Real-time Databases", http://www.cs.helsinki.fi/u/jplindst/papers/icicca2010.pdf, Research Paper, Dec. 2, 2015, 6 pages.
International Searching Authority, Search Report & Written Opinion for Appln No. PCT/US2016/015828, dated Nov. 3, 2016, 8 pages.

* cited by examiner

HYBRID CONCURRENCY CONTROL

BACKGROUND

Transaction processing systems, including database management systems and online transaction processing applications, process state in individual, indivisible groups of one or more operations called transactions to maintain integrity of data. Each transaction succeeds or fails as a complete unit. If some of the operations complete but errors occur if others are attempted, the transaction processing system aborts the transaction and "rolls back" all of the operations to a consistent, known state before the transaction began. If the operations of a transaction are completed successfully, the transaction is committed by the system, and all changes to state are made permanent.

In order to increase performance, transaction processing systems can run multiple transactions concurrently, and different transactions may attempt to access shared state concurrently. Such access is generally coordinated via a concurrency control mechanism to generate a system state that would be obtained if the transactions were executed serially. Concurrency control mechanisms permit concurrent operations and execution of potentially conflicting transactions to maintain the integrity of data.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise. Although examples may be described in terms of database management systems or online transaction processing (OLTP) applications, the scope of this disclosure is not intended to be limited to such examples.

Concurrency control mechanisms in transaction processing systems orchestrate concurrent transactions and operations on shared state to maintain state including transaction isolation. State can include a database record, row, volume, pages, and other data objects, which are collectively referred to as objects. Examples of concurrency control mechanisms include pessimistic concurrency control and optimistic concurrency control.

Pessimistic concurrency control initially applies a lock to an object accessed in a transaction to prevent another concurrent update to the object. Pessimistic concurrency control blocks conflicting operations of a transaction if it may cause a violation of data integrity until the possibility of the violation disappears. Once a transaction acquires a lock to an object, no other conflicting transactions can process that object, such as reading the object or updating the object, until the lock is released, which can occur after the transaction has committed. A disadvantage of pessimistic concurrency control includes a potentially heavy overhead for acquiring the lock on each transaction and checking for locks prior to accessing state. Pessimistic concurrency control assumes that multiple transactions or operations will update the same object at the same time regardless of how unlikely such contentions might be.

Optimistic concurrency control, in contrast, assumes that although contentions are possible, such contentions will be relatively rare. Optimistic concurrency control allows the operations to progress and often delays resolution of contentions until the transaction is almost ready to commit and a violation of data integrity is almost certain. If a contention is detected, a concurrency control protocol performs a resolution of the contention typically by aborting at least one of the conflicting transactions, including rolling back and discarding any attempted changes to state, and re-executing the aborted transaction or transactions. Disadvantages of optimistic concurrency control mechanisms include relatively expensive overhead created from rollbacks and restarting transactions that, at times, can be nearly completed when contentions are detected.

Both pessimistic and optimistic concurrency control mechanism can properly protect and update state, and transaction processing systems attempt to apply a concurrency control mechanism that reduces relative performance penalties or improves relative performance benefits for the given workload. For example, optimistic concurrency control mechanisms are often applied in main memory database systems because of its relatively low overhead and relatively high scalability in handling many OLTP workloads with objects under low or moderate contention. In contrast, pessimistic concurrency control mechanisms are often preferred in systems of high contention that may include a relatively large set of transactions reading from and writing to a relatively small set of objects. Accordingly, transaction processing systems that employ optimistic concurrency control are relatively inefficient for workloads that include frequent read-write contentions, and pessimistic concurrency control mechanisms are relatively inefficient for systems that will scale up to a relatively large number of logical processor nodes for a workload with a relatively lower contention level.

Transaction processing system workloads, however, can be dynamic. Objects can change from high contention to low contention and conversely. For example, certain items may become more or less popular than others on online shopping websites around the time of major holidays or product launches, and the associated database management system is affected by such workload changes. Also, a transaction processing system can include multiple types of frequently accessed objects, such as read-most data records and write intensive data records. An optimistic concurrency control mechanism may cause a relatively large amount of transactions to abort on write-intensive data records and a pessimistic concurrency control mechanism will limit scalability of read-most data records due to lock contention. Modern transaction processing systems, including distributed systems and cloud infrastructure, having many processor nodes and non-uniform memory access architecture in such circumstances could be underutilized or even inefficient.

Examples of hybrid concurrency control in which the transaction processing systems selects the concurrency control mechanism to a dynamic workload are disclosed. Rather than suffering performance inefficiencies from applying an inappropriate concurrency control mechanism, the example systems and methods selects an appropriate mechanism based on information including object access patterns. The hybrid concurrency control can efficiently serve both read-most and contention records in the same database. Further, the systems and methods dynamically track record access patterns and apply pessimistic concurrency control mechanisms for objects currently under heavy contention and optimistic concurrency control mechanisms for objects currently under low or moderate contention and adjust as workloads change.

Figure 1:
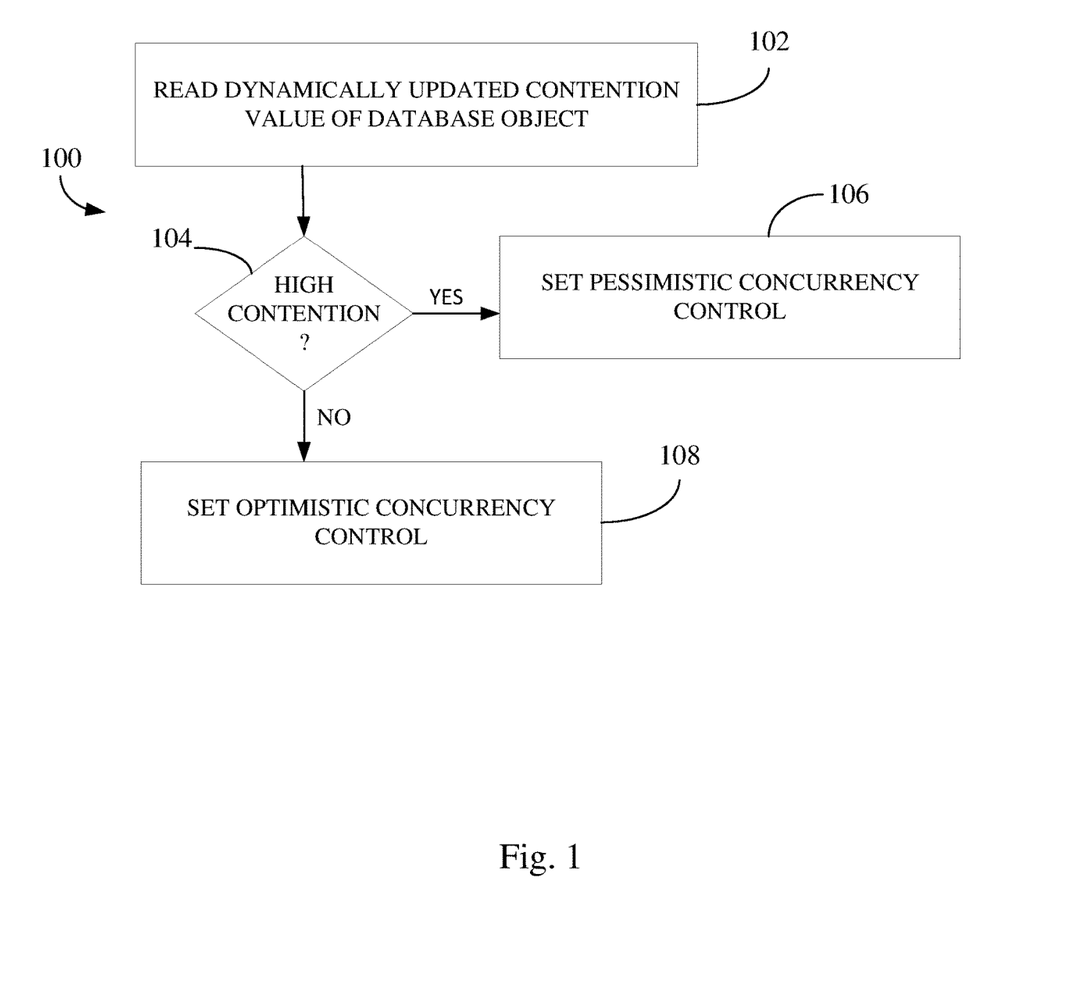
FIG. 1 is a flow diagram illustrating an example method of the disclosure.

FIG. 1 illustrates an example method 100 of a hybrid concurrency control in a database transaction based on workload. A contention value associated with a database object is read at 102. The contention value is dynamically updated based on access patterns of the database object. If the dynamically updated contention value indicates the database object is under high contention at 104, or if the contention value is beyond a selected threshold contention amount, a pessimistic concurrency control mechanism is applied to the database object at 106. An optimistic concurrency control mechanism is applied to the database record at 108 if the dynamically updated contention value does not indicate the database object is under high contention at 104.

Method 100 can be implemented in a combination of hardware and computer programming. For example, the programming can be processor executable instructions stored on at least one non-transitory machine-readable storage medium, such as storage device or memory. The hardware can include at least one processor to execute the instructions loaded or stored in memory. In some examples, the hardware can also include other electronic circuitry to at least partially implement at least one feature of method 100. In some examples, the at least one storage medium may store instructions that, when executed by the processor, at least partially implements some or all features of method 100. In some examples, method 100 can be at least partially implemented with electronic circuitry.

In one example, method 100 dynamically and locally incorporates pessimistic concurrency control into a generally optimistic concurrency control mechanism for database objects under high contention. Optimistic concurrency control can be implemented to the database object when the workload changes to low contention, or not high contention. To detect whether a database object is under high contention, a contention value representative of access patterns is associated with each database object in one example.

Figure 2:
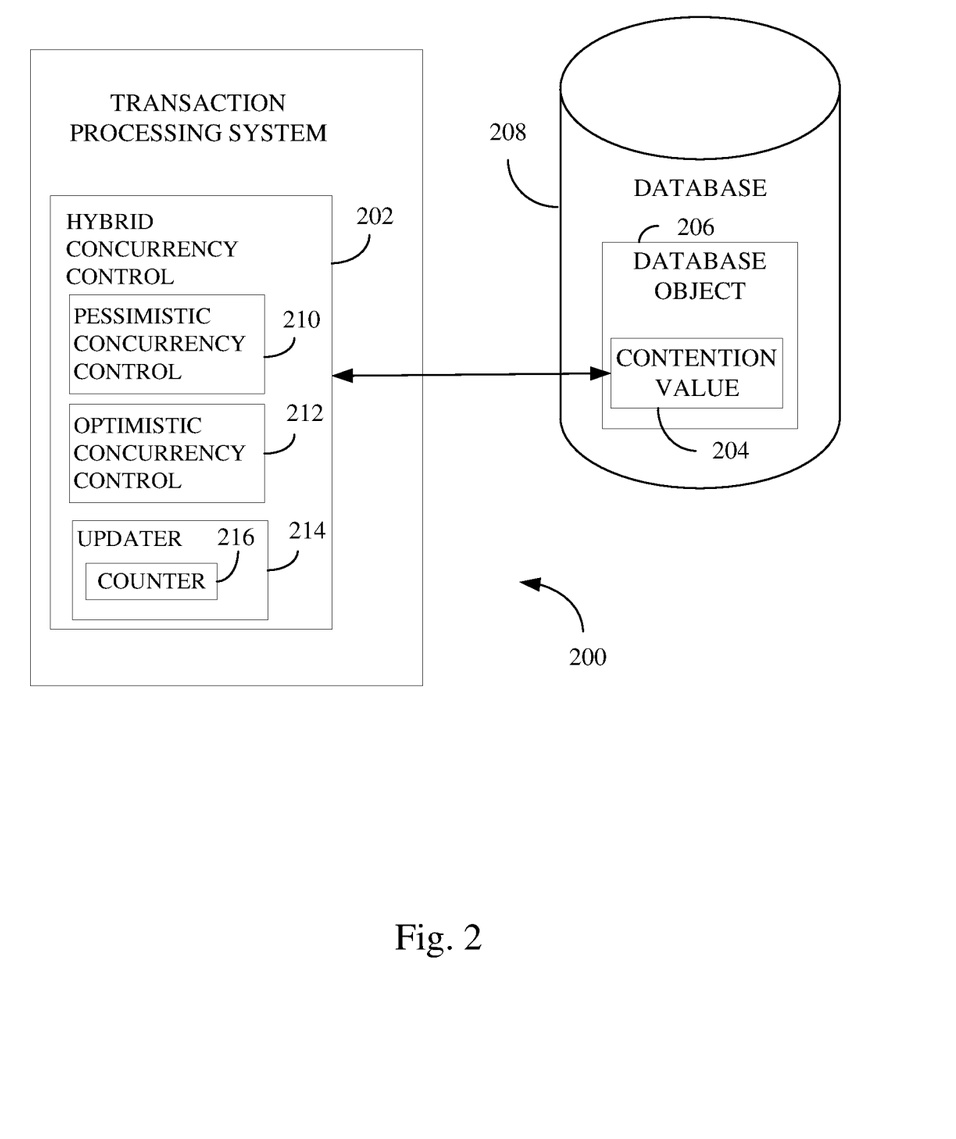
FIG. 2 is a schematic diagram illustrating an example system to implement the method of FIG. 1.

FIG. 2 illustrates an example transaction processing system 200 including a hybrid concurrency control system 202 to implement method 100. System 202 reads a contention value 204 that is associated with a database object 206, such as a database record, stored in a database 208. The database 208 can store one or more objects 206. In one example, the contention value 204 can be included as part of the transaction processing system 200. The hybrid concurrency control system 202 also includes a pessimistic concurrency control mechanism 210 and an optimistic concurrency control mechanism 212 that can be applied to the database object 206 depending on whether the database object 206 is under high contention. An updater 214 and, in some examples, counter 216 dynamically track access patterns of the database 208. Based on access patterns, updater 214 sets and dynamically adjusts the contention value 204 to indicate whether the database object 206 is under high contention or low contention, i.e., not high contention.

In one example, the size and configuration of the database object 206 can be based on granularity of the concurrency control mechanisms 210, 212. In other examples, the granularity of the concurrency control mechanisms 210, 212 can be configured to improve performance efficiency of the database depending on access patterns. For example, granularity of the scope of concurrency control can be adjusted in a record that includes certain rows accessed more frequently than others. Accordingly, each row may include a contention value for a particular period of time. If all the rows become frequently accessed or infrequently accessed, a contention value 204 may be dynamically applied to the record instead of each row. Granularity can also be based on user-defined criteria. For example, if a shopping site includes a large percentage of items under a "Recently Added" category as being under high contention, the system can adjust all items under the "Recently Added" category as being under high contention. Other examples are contemplated.

Updater 214 and, in some examples, counter 216 dynamically track access patterns of transactions on the database 208 including access patterns of the database object 206. In one example, the updater 212 dynamically tracks one or more contention statistics such as number of transactions for each object 206 in the database 208, number or transaction that abort (or other conflict resolution schemes), i.e., the number of aborts, for each object 206, date and time of the transactions and aborts, type of aborts such as aborts due to contention and aborts due to power failure and other reasons, computing overhead and time expended in rollbacks or locks, as well as other statistics regarding frequency of object accesses and success of transactions regarding particular database objects 206 or the database 208 in general. Furthermore, updater 214 can make use of various statistical analysis mechanisms including prediction engines to update the contention value 204.

Several implementations of the contention value 204 are contemplated. In one example, the contention value 204 can include a field or other data structure in a header of the database object 206. In another example, the contention value 204 can be stored in a table or other data structure mapped to the database object 206 but stored apart from the database object 206. The contention value 204 can include a flag or Boolean set to true to indicate, for example, the associated database object is under high contention. In another example, the contention value 204 can include an integer value representative of an amount of contention as determined from the updater 212.

In one example, the pessimistic concurrency control mechanism 210 includes a two-phase locking (2PL) protocol. In general, a lock is a system object associated with a shared resource, and is held by the transaction performing operations on the shared resource. A prospective transaction from transaction processing system 200 attempting to access database object 206 determines whether the database object 206 includes a lock acquired by another transaction. A lock acquired by a transaction "blocks" ("conflicts with") prospective transactions from performing conflicting operations (e.g., read vs. write and write vs. write) on the database object 206 according to a predefined agreement or scheme.

In general, the lock does not directly block the prospective transaction but rather blocks the prospective transaction from acquiring another conflicting lock on the same database object.

In one example, two types of locks can be acquired. An exclusive lock, or write-lock, is associated with a database object 206 by a transaction before writing (including inserting, modifying, and deleting) the database object. A shared lock, or read-lock, is associated with the database object 206 by a transaction before reading (retrieving state) of the database object. An exclusive lock blocks other transactions from acquiring exclusive locks and shared locks. A shared lock blocks other transactions from acquiring exclusive locks.

An example 2PL protocol approaches locks in two distinct, consecutive phases during execution of the transaction. In an expanding phase, locks are acquired and no locks are released. In a shrinking phase, locks are released and no locks are acquired, such as after the transaction commits or aborts. Pessimistic concurrency control mechanism 210 can include other protocols.

Optimistic concurrency control mechanism 212 can include protocols that do not acquire locks prior to performing operations of the transaction. Before committing the transaction, optimistic concurrency control mechanism 212 verifies that no other transaction has modified the data object 206. In one example, optimistic concurrency control mechanism 212 can record a timestamp to mark the beginning of a transaction and the creation/update of an object, read values and tentatively write changes, and validate that no other transaction, whether completed or active, has modified the data object 206 by inspecting timestamp changes over the data object 206. If no conflicts exist, the transaction will commit; otherwise, the optimistic concurrency control mechanism 212 will abort the transaction or apply another conflict resolution scheme, which are generally referred to as an abort in this disclosure. For example, optimistic concurrency control mechanism 212 can take exclusive locks for writes and verify reads when the transaction is ready to commit.

Hybrid concurrency control system 202 can initialize the contention value 204 to a first contention setting, and access the database objects 206 in a first concurrency control protocol 210 or 212 unless the contention value 204 has been changed to a second contention setting. After the contention value 204 has been dynamically changed to the second contention setting, transaction will access the database in a second concurrency protocol 212 or 210 until the contention value has been dynamically changed to the first contention setting. For example, in a highly scalable OLTP, the updater 214 can initially set the contention value 204 of a new database object 206 to indicate low contention, or not high contention. Transactions accessing the database object 206 will initially apply optimistic concurrency control mechanism 212 and apply optimistic concurrency control mechanism 212 until the contention value 204 has been changed to indicate high contention.

Figure 3:
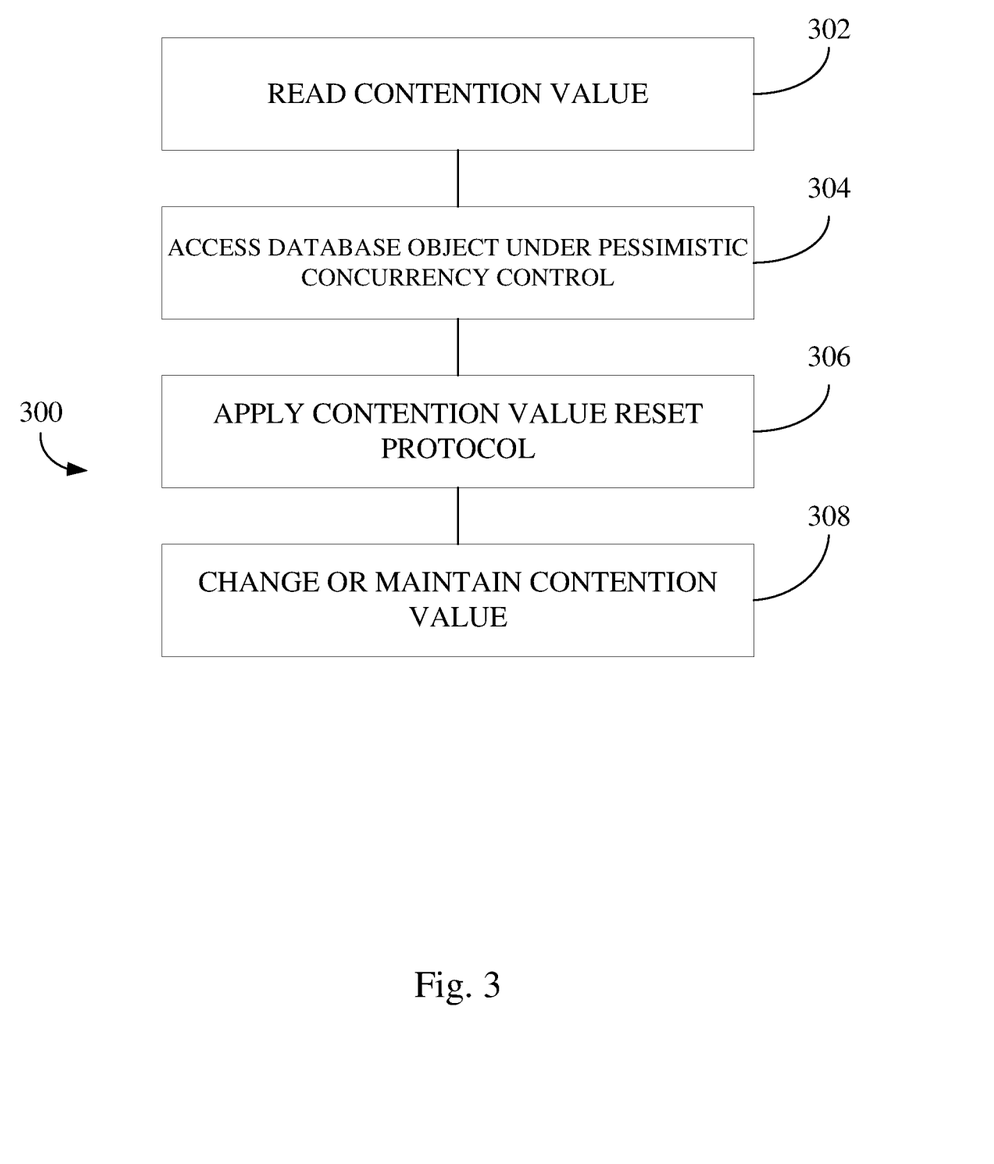
FIG. 3 is a block diagram illustrating an example feature of the method of FIG. 1.

FIG. 3 illustrates an example method 300 of the hybrid concurrency control system 202 for accessing a database object under high contention. In one example, the method 300 can be implemented by a combination of hardware and programming, such as the system described below and illustrated in FIG. 6. A transaction attempts to access the database object and reads the contention value 204 at 302. The contention value 204 can include, for example, a Boolean set to indicate high contention or low contention, a contention amount integer representative of an amount of contention, or another dynamically tracked access statistic. In one example, a database object under high contention includes a contention amount that surpasses a predefined contention threshold amount. For example, the predefined contention threshold amount may be "10," and contention values of 10 (or more) indicate the database object is to be accessed under the pessimistic concurrency control protocol 210 at 304. (In this example, contention values of 0 to 9 indicate the database object is under low contention.) In another example, a contention value set to true (or false), indicate the database object is to be accessed under the pessimistic concurrency control protocol 210. In one example, the 2PL protocol is applied and the transaction is processed.

Additionally, setting the contention value 204 to indicate high contention can begin a reset protocol at 306 in updater 214. In one example, the reset protocol at 306 for a contention value 204 indicating high contention can include dynamically tracking access patterns of the database object 206 in updater 214 to re-evaluate the contention value 204. For example, the reset protocol can determine whether to reset the contention value 204 to indicate the database object 206 is not under high contention (such as back to 0) or to maintain the contention value to indicate the database object is under high contention at 308. In one example, the reset protocol can begin a timer that will reset the contention value to indicate the database object 206 is not under high contention after a pre-selected elapsed period of time. In another example, the reset protocol can track access patterns to determine the frequency of transactions accessing the database objects 206 using counter 216 and reset the contention value to indicate the database object is not under high contention if a determined frequency of access is below a selected amount.

Figure 4:
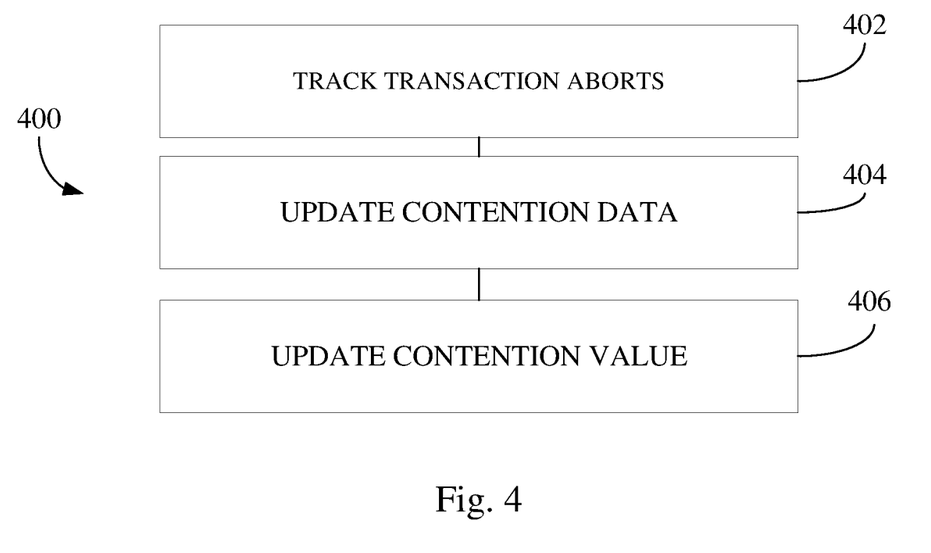
FIG. 4 is a flow diagram illustrating an example feature of the method of FIG. 1.

FIG. 4 illustrates an example method 400 of hybrid concurrency control system 202 to dynamically update the contention value under low contention. In one example, the method 400 can be implemented by a combination of hardware and programming, such as the system described below and illustrated in FIG. 6. Transactions accessing the database object 206 under optimistic concurrency control 212 are susceptible to conflict resolution schemes such as aborts and rollbacks. To determine whether to change the contention value 204, the updater 214 can track the number or frequency of aborts or other conflict resolution schemes of transactions accessing the database object 206 at 402. The number or frequency of aborts or other conflict resolution schemes can be tracked within the updater 214 as contention data at 404. Once the contention data has attained a selected amount, the updater 214 can adjust the contention value at 406.

An occasional abort of a transaction may not warrant setting the contention value 204 to indicate a high contention and invoke the pessimistic concurrency mechanism 210 for subsequent transactions. Instead, the hybrid concurrency control system 202 can determine a frequency and reason of aborts, such as an amount of aborts in a given time period caused by contentions, that may warrant invoking the pessimistic concurrency control mechanism 210 to improve database performance or efficiency.

Further, incrementing the contention value 204 for each abort can be computationally expensive. For instance, setting each transaction to update the contention value 204 of a database object 206 under high contention can negatively affect scalability. In one example, the counter 216 can be applied to increment the contention data within the updater 214, and the contention value can be updated or adjusted when the contention data attains targets. For example, a contention value 204 can be changed from low contention to indicate high contention with a Boolean after the contention data has counted a given number of aborts in a certain time period. In another example, a contention value 204 having an integer can be incremented after the contention data has counted a given number of aborts. Other examples are contemplated.

Figure 5:
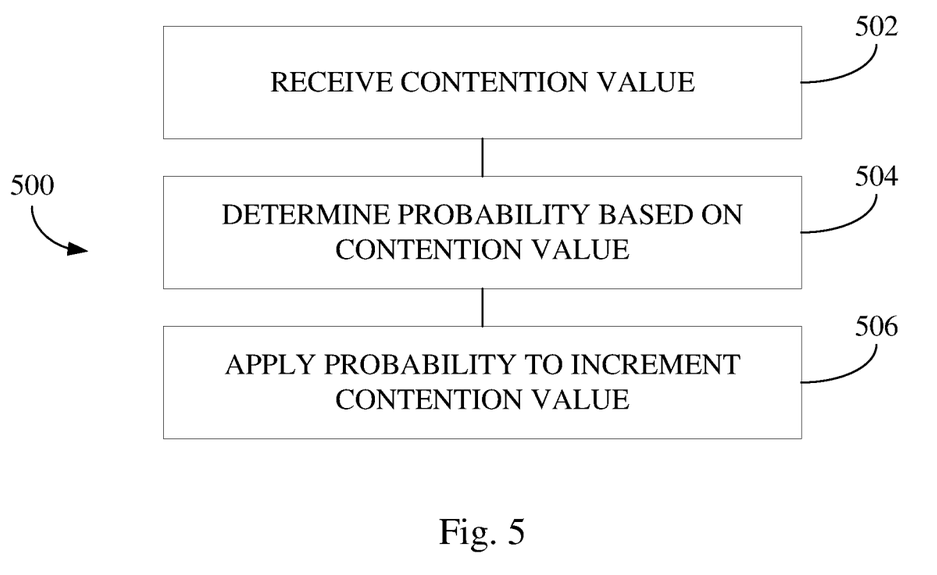
FIG. 5 is a block diagram illustrating an example feature of the method of FIG. 4.

FIG. 5 illustrates an example method 500 of the updater 214 incrementing the contention value 204 using an approximate amount of aborts. In one example, the method 500 can be implemented by a combination of hardware and programming, such as the system described below and illustrated in FIG. 6. The updater 214 loads the contention value 204 of a database object under low contention at 502. In one example, the contention value is loaded after an abort. The contention value 204 can be applied to determine a probability of incrementing the contention value at 504. The probability of incrementing can be applied to determine whether to increment the contention value.

In one example of 504, the probability p of incrementing the contention value at 504 can be the inverse of two to the power of the contention value, that is:

$$p=1/(2^{\wedge}(c))$$

where c is an integer contention value assigned to the database object.

In one example applying the probability of incrementing to determine whether to increment the contention value at 506,

```
// random( ) is a random number generator that returns a value in [0...1)
if random( ) < p do
    c := c + 1
return c
```

In the examples, the contention value can represent a logarithmic count of aborts, which can suffice for detecting contentious database objects 206. Other coefficients or calculations can be applied in 504 and 506. In one example, a contention value can be initialized or reset to 0 and incremented based on data access patterns; and a contention value of 10 can indicate a database object under high contention to warrant invoking the pessimistic concurrency control. Other integer values indicating low and high contention are contemplated.

Figure 6:
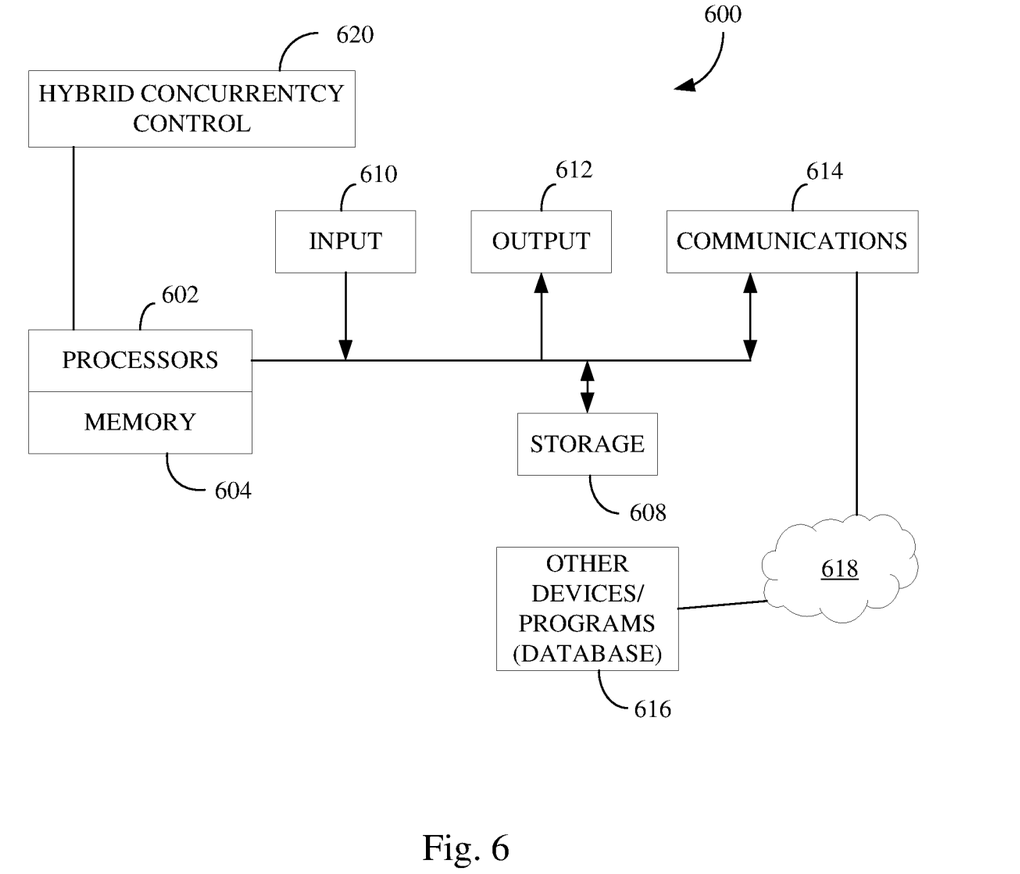
FIG. 6 is a schematic diagram illustrating an example computing device that can be used to implement the method of FIG. 1 and the system of FIG. 2.

FIG. 6 illustrates an example computer system that can be employed in an operating environment and used to host or run computer programming in the form of a computer application 620 implementing example method 100, and other methods of the disclosure, as included on one or more computer readable storage mediums storing computer executable instructions for controlling the computer system, such as a computing device, to perform a process. In one example, the computer system of FIG. 6 can be used to implement modules and associated tools of application 620 corresponding with system 200 including hybrid concurrency control system to implement the functionalities of methods 100, 300, 400, 500

The exemplary computer system of FIG. 6 includes a computing device, such as computing device 600. Computing device 600 typically includes one or more processors 602 and memory 604 for storing and executing application 620. The processors 602 may include two or more processing cores on a chip or two or more processor chips. In some examples, the computing device 600 can also have one or more additional processing or specialized processors (not shown), such as a graphics processor for general-purpose computing on graphics processor units, to perform processing functions offloaded from the processor 602. Memory 604 may be arranged in a hierarchy and may include one or more levels of cache. Memory 604 may be volatile (such as random access memory (RAM)), non-volatile (such as read only memory (ROM), flash memory, etc.), or some combination of the two. The computing device 600 can take one or more of several forms. Such forms include a tablet, a personal computer, a workstation, a server, a handheld device, a consumer electronic device (such as a video game console or a digital video recorder), or other, and can be a stand-alone device or configured as part of a computer network, computer cluster, cloud services infrastructure, or other.

Computing device 600 may also include additional storage 608. Storage 608 may be removable and/or non-removable and can include magnetic or optical disks or solid-state memory, or flash storage devices. Computer storage media includes volatile and nonvolatile, removable and non-removable media implemented in any suitable method or technology for storage of information such as computer readable instructions, data structures, program modules or other data. For example, application 620 can be stored in storage 808, and at least one or more components of application 520 can be loaded and stored into memory 604 for execution on processor 602. A propagating signal by itself does not qualify as storage media.

Computing device 600 often includes one or more input and/or output connections, such as USB connections, display ports, proprietary connections, and others to connect to various devices to receive and/or provide inputs and outputs. Input devices 610 may include devices such as keyboard, pointing device (e.g., mouse), pen, voice input device, touch input device, or other. Output devices 612 may include devices such as a display, speakers, printer, or the like. Computing device 600 often includes one or more communication connections 614 that allow computing device 600 to communicate with other computers/applications 616 such as a distributed database. Example communication connections can include, but are not limited to, an Ethernet interface, a wireless interface, a bus interface, a storage area network interface, a proprietary interface. The communication connections can be used to couple the computing device 600 to a computer network 618, which is a collection of computing devices and possibly other devices interconnected by communications channels that facilitate communications and allows sharing of resources and information among interconnected devices. Examples of computer networks include a local area network, a wide area network, the Internet, or other network.

Computing device 600 can be hosted in a cloud computing environment that includes one or more interconnected cloud computing nodes configured to communicate with local computing. Cloud computing environment includes features such as statelessness, low coupling, modularity, and semantic interoperability. Cloud computing nodes can be configured as computing devices including a processor, memory, storage, communication components, and software in the form of program modules stored in the memory. Cloud computing nodes may be grouped physically or virtually in one or more networks or in one or more cloud deployment models. The cloud computing environment offers services such as infrastructure, platforms, software, and business processes.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A computer-implemented method of hybrid concurrency control for database transactions, the method comprising:
accessing a database object stored in a database, wherein the database comprises a plurality of database objects including the database object and a contention value, and wherein the contention value is dynamically updated based on at least one database transaction of the database transactions;
initiating an attempted transaction to read the contention value associated with the database object stored in the database;
when the contention value indicates the database object is under high contention, applying a pessimistic concurrency control mechanism to the database object, wherein the pessimistic concurrency control mechanism initially applies a lock to the database object to prevent a concurrent update with the attempted transaction to the database object and releases the lock to the database object upon committing the database transaction, and wherein the pessimistic concurrency control mechanism includes a two-phase locking protocol, the two-phase locking protocol comprising an expanding phase and a shrinking phase; and
when the contention value indicates the database object is not under high contention, applying an optimistic concurrency control mechanism to the database object.

2. The computer-implemented method of claim 1 wherein the database object is initialized with a contention value to indicate the database object is not under high contention.

3. The computer-implemented method of claim 1 wherein the contention value is dynamically updated based on aborts of transactions accessing the database object under the optimistic concurrency control mechanism.

4. The computer-implemented method of claim 3 wherein the contention value is dynamically updated based on frequency of aborts of transactions.

5. The computer-implemented method of claim 1 where the contention value is dynamically updated based on an amount of time under the pessimistic concurrency control mechanism.

6. The computer-implemented method of claim 5 wherein the contention value is reset to indicate the database object is not under high contention after a selected amount of time under high contention.

7. The computer-implemented method of claim 1 wherein the pessimistic concurrency control mechanism include acquiring locks prior to the database transaction performing operations on the database object.

8. The computer-implemented method of claim 7 wherein the pessimistic concurrency control mechanism includes a two-phase locking protocol.

9. The computer-implemented method of claim 1 wherein the expanding phase acquires locks without releasing the locks, and wherein the shrinking phase releases the locks without acquiring the locks.

10. The computer-implemented method of claim 1 wherein the lock to the database object is configured to block the attempted transaction from acquiring a conflicting lock on the database object.

11. The computer-implemented method of claim 1, further comprising:
upon exceeding an elapsed period of time, reevaluating the contention value for the database object; and
when a frequency of the database transactions have exceeded a contention threshold amount, update the contention value for the database object from not under high contention to under high contention.

12. The computer-implemented method of claim 1, further comprising:
identifying the database transaction corresponding with an abort operation for the database object; and
dynamically incrementing a counter associated with the database object.

13. A non-transitory computer readable medium for storing computer executable instructions for controlling a computing device to perform a method of hybrid concurrency control for database transactions, the method comprising:
accessing a database object stored in a database, wherein the database comprises a plurality of database objects including the database object and a contention value, and wherein the contention value is dynamically updated based on at least one database transaction of the database transactions;
initiating an attempted transaction to read the contention value associated with the database object stored in the database;
when the contention value indicates the database object is under high contention, applying a pessimistic concurrency control mechanism to the database object, wherein the pessimistic concurrency control mechanism initially applies a lock to the database object to prevent a concurrent update with the attempted transaction to the database object and releases the lock to the database object upon committing the database transaction, and wherein the pessimistic concurrency control mechanism includes a two-phase locking protocol, the two-phase locking protocol comprising an expanding phase and a shrinking phase; and
when the contention value indicates the database object is not under high contention, applying an optimistic concurrency control mechanism to the database object.

14. The non-transitory computer readable medium of claim 13 wherein the contention value is an integer.

15. The non-transitory computer readable medium of claim 14 wherein the contention value is incremented based on an access patterns of the database object including an amount of abort transactions accessing the database object.

16. The non-transitory computer readable medium of claim 13 wherein the contention value is dynamically updated based on a probability.

17. A system to apply hybrid concurrency control for database transactions, the system comprising:
a processor; and
a memory comprising instructions executable by the processor to:
access a database object stored in a database, wherein the database comprises a plurality of database objects including the database object and a contention value, and wherein the contention value is dynamically updated based on at least one database transaction of the database transactions;

initiate an attempted transaction to read the contention value stored with the database object stored in the database;

when the contention value indicates the database object is under high contention, apply a pessimistic concurrency control mechanism to the database object, wherein the pessimistic concurrency control mechanism initially applies a lock to the database object to prevent a concurrent update with the attempted transaction to the database object and releases the lock to the database object upon committing the database transaction, and wherein the pessimistic concurrency control mechanism includes a two-phase locking protocol, the two-phase locking protocol comprising an expanding phase and a shrinking phase; and when the contention value indicates the database object is not under high contention, apply an optimistic concurrency control mechanism to the database object.

18. The system of claim 17 including an updater to dynamically track access patterns based on an amount of aborts of transactions accessing the database object.

19. The system of claim 18 wherein the contention value is dynamically updated based on a probability determined with the updater.

* * * * *